(12) United States Patent
Strähle

(10) Patent No.: US 6,392,797 B2
(45) Date of Patent: May 21, 2002

(54) VIEWING APPARATUS

(75) Inventor: Fritz Strähle, Heubach (DE)

(73) Assignee: Carl-Zeiss-Stiftung, Heidenheim-Brenz (DE)

(*) Notice: Subject to any disclaimer, the term of this patent is extended or adjusted under 35 U.S.C. 154(b) by 0 days.

(21) Appl. No.: 09/866,761

(22) Filed: May 30, 2001

(30) Foreign Application Priority Data

May 31, 2000 (DE) .......................... 100 27 163

(51) Int. Cl.$^7$ .............................. G02B 21/06; A61B 3/10
(52) U.S. Cl. ...................... 359/389; 359/368; 359/385; 351/221; 351/243
(58) Field of Search ......................... 359/362, 368–390, 359/642, 708; 351/216–235, 243

(56) References Cited

U.S. PATENT DOCUMENTS

| | | | |
|---|---|---|---|
| 5,126,877 A | 6/1992 | Biber ......................... | 359/389 |
| 5,214,538 A | * 5/1993 | Lobb .......................... | 359/691 |
| 5,506,634 A | * 4/1996 | Wei et al. ................... | 351/221 |
| 5,838,491 A | 11/1998 | Gärtner et al. .............. | 359/385 |
| 5,867,311 A | * 2/1999 | Nakamura ................... | 359/389 |
| 5,973,829 A | * 10/1999 | Moller et al. ............... | 359/389 |
| 5,986,806 A | * 11/1999 | Sugawara ................... | 359/557 |

* cited by examiner

*Primary Examiner*—Thong Nguyen
(74) *Attorney, Agent, or Firm*—Walter Ottesen

(57) ABSTRACT

The invention is directed to a viewing arrangement (1) having a viewing optic (3) for viewing an object (5) along a viewing beam path. The viewing arrangement (1) also has an illuminating apparatus (9) for illuminating the object (5) along an illuminating beam path running segment-wise transversely to the viewing beam path. A beam-shaping illuminating element (15) is mounted in the segment of the illuminating beam path running transversely to the viewing beam path. The illuminating element (15) is asymmetrical relative to the illuminating beam path.

13 Claims, 3 Drawing Sheets

VIEWING APPARATUS

FIELD OF THE INVENTION

The invention relates to a viewing apparatus having a viewing optic for viewing an object. The object is viewed along a viewing beam path and the viewing apparatus further includes an illuminating device for illuminating the object along an illuminating beam path running in segments transverse to the viewing beam path.

BACKGROUND OF THE INVENTION

A viewing apparatus of the above kind and configured as a stereoscopic surgical microscope is disclosed, for example, in U.S. Pat. No. 5,126,877. The viewing optic of this surgical microscope includes a main objective through which both stereo component beam paths of the viewing beam path pass and a separate zoom system is provided for each of the two stereo component beam paths. The illuminating arrangement includes two lens elements centered with respect to each other and whose optical axis runs transversely to the viewing beam path. The illuminating beam path of this stereo microscope passes through the two lens elements and, after the deflection by a deflecting element, through the primary objective whereby very favorable illuminating angles can be achieved.

U.S. Pat. No. 5,838,491 discloses a further viewing apparatus which is a stereomicroscope having an objective of variable focal intercept. Differently distanced objects or object regions can be focused with the objective having a variable focal intercept or variable work distance. In this stereomicroscope, the illuminating beam path runs outside of the objective of variable focal intercept in order to avoid reflections of the illuminating light on the viewing optic in the viewing beam path. The illuminating arrangement includes pivotable deflecting elements whose particular inclination is dependent upon the corresponding focal intercept of the objective in order to achieve the most optimal illumination for each focal intercept. This known viewing apparatus is therefore very complex as to its construction.

SUMMARY OF THE INVENTION

It is an object of the invention to provide a viewing apparatus having an improved illuminating arrangement.

The viewing arrangement of the invention includes: a viewing optical assembly for viewing an object along a viewing beam path; an illuminating assembly for illuminating the object along an illuminating beam path having a segment running transversely to the viewing beam path; and, a beam-shaping illuminating element arranged in the segment of the illuminating beam path and being configured to be asymmetrical relative to the illuminating beam path.

With the invention, the illuminating radiation can be formed in correspondence to its passage through the peripheral region of an optical element of the viewing optic. This is basically advantageous for the optimal adaptation of the illuminating beam path to the viewing beam path. In this way, problems from illuminating light reflections in the viewing beam path are significantly reduced which reflections would otherwise reduce the viewing contrast.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
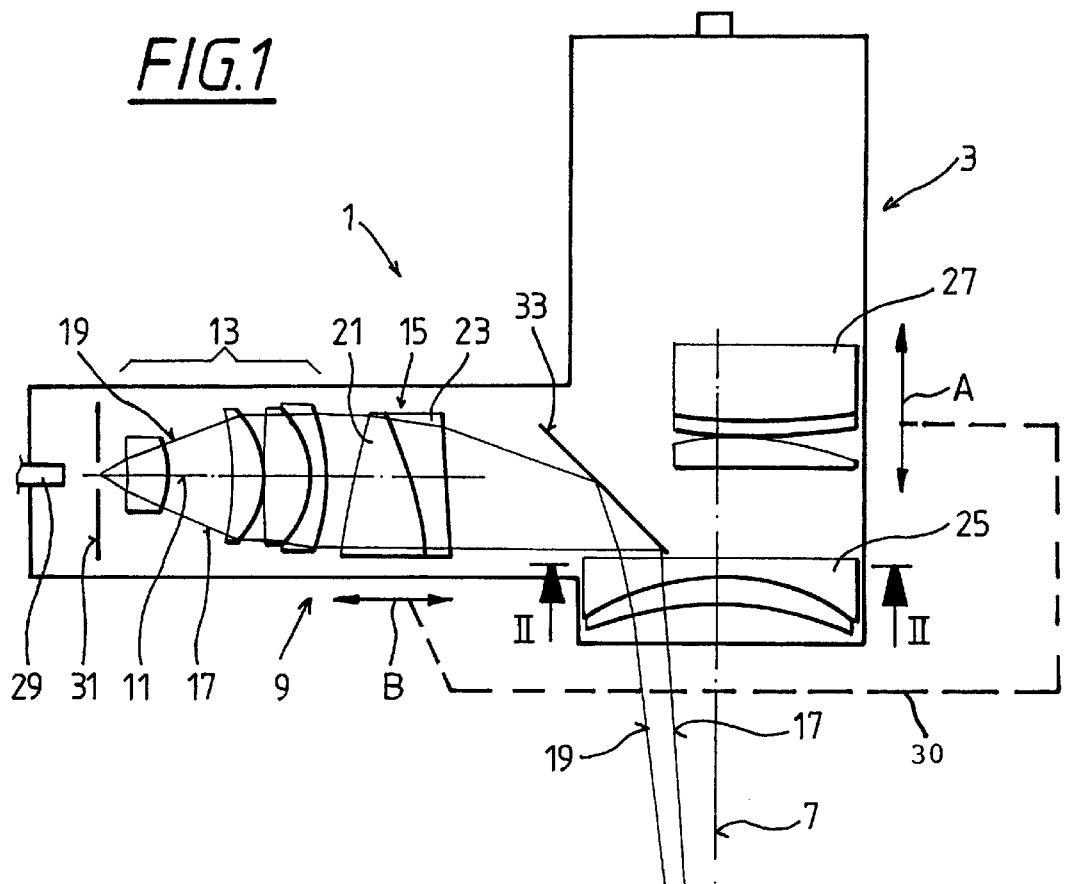
FIG. 1 is a schematic section view of a first embodiment of a viewing apparatus in accordance with the invention.

FIG. 1 shows a viewing apparatus according to the invention configured as a stereomicroscope 1. The stereomicroscope 1 includes a viewing optic 3 for viewing an object 5. The viewing beam path of the viewing optic 3 runs along an optical axis 7 of the viewing optic 3.

An illuminating arrangement 9 of the viewing apparatus 1 is provided for illuminating the object 5. The illuminating arrangement 9 includes an illuminating beam path running segment-wise transversely to the viewing beam path and therefore to the optical axis 7 of the viewing optic 3. The illuminating beam path runs transversely to the viewing beam path and is characterized by the optical axis 11 of a collector 13. The illuminating arrangement 9 includes a beam-shaping illuminating element 15 which is asymmetrical to the section of the illuminating beam path running transversely to the viewing beam path.

The illuminating beam path can be seen in FIG. 1 based on the margin rays 17 and 19 of an axial illuminating beam.

The asymmetrical illuminating element 15 includes the off-center region of a composite element formed from two individual lenses 21 and 23.

The viewing optic 3 includes an objective having a variable focal intercept. The objective is formed from a negative lens element 25 and a displaceable element 27 having positive refractive power. To change the focal intercept, the displaceable lens element 27 is displaced along the optical axis 7 of the viewing optic 3 as shown in FIG. 1 by the double arrow A.

In the viewing arrangement 1, the asymmetrical illuminating element 15 is displaced with a displacement of the lens element 27. This displacement of the illuminating element 15 is along the optical axis 11 as shown by the double arrow B in FIG. 1.

The displacement of the beam-shaping illuminating element 15 can be coupled to the displacement of displaceable lens element 27 as indicated by coupling 30.

The illuminating arrangement 9 further includes a light conductor 29 which illuminates an illuminated field diaphragm 31 located in the forward focal plane of the collector 13. For this reason, parallel illuminating beams are present in the illuminating beam path between the collector 13 and the asymmetrical illuminating element 15. After the asymmetrical illuminating element 15, the illuminating beam path is deflected by a deflecting element 33 to the object 5. The deflecting element 33 is configured as a planar mirror. The illuminating beam path passes through an off-center region of the negative lens element 25 of the viewing optic 3.

Figure 2:
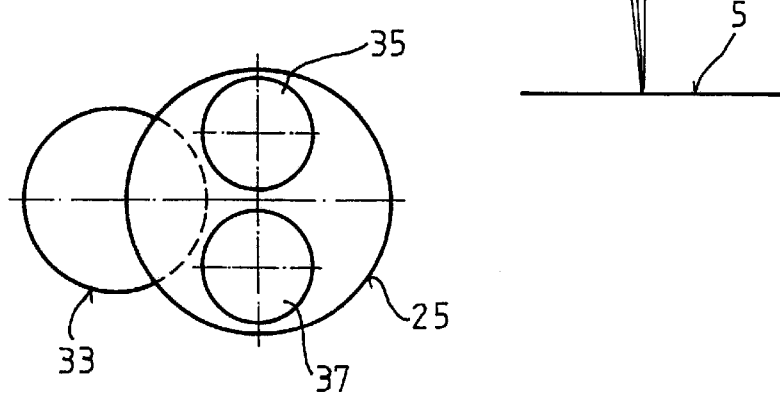
FIG. 2 is a section view of a viewing arrangement of FIG. 1 viewed in the direction of arrows II of FIG. 1.

In the section plan view of FIG. 2, the two stereoscopic component viewing zones 35 and 37 of the viewing optic are shown with the diameter which they have when passing through the negative element 25 of the viewing optic 3. It can be seen that the illuminating zone, which is fixed by the deflecting element 33, is separated from the two viewing zones 35 and 37 to avoid the illuminating light reflections in the viewing beam path.

In the viewing arrangement 1, it is noted that the illuminating beam path is coupled into the viewing beam path between the displaceable positive element 27 and the fixed negative element 25 of the objective of variable focal intercept. In this arrangement, the illuminated field on the object 5 is just as large as the object field imaged by the viewing optic 3 and the illuminated field is centered to the center of the object field. The illuminating angle can be varied in a simple manner by decentering the collector 13, that is, by a transverse displacement of the optical axis 11.

A further aspect of the viewing arrangement 1 is that, when the displacement path of the displaceable lens element 27 for varying the focal intercept is equal to the displacement path of the asymmetrical illuminating element 15, then, for each focal intercept, illuminated field and object field are always of the same size and are centered to each other. This is the case notwithstanding light paths of different lengths between asymmetrical illuminating element 15 and negative element 25, on the one hand, as well as between positive element 27 and negative element, on the other hand, and notwithstanding different focal lengths of asymmetrical illuminating element 15 and positive element 27.

This optimal matching of the illuminated field and object field as well as their invariance compared to the same displacement, in magnitude, of displaceable lens element 27 and asymmetrical illuminating element 15 is not lost even for an exchange of the negative element 25. For this reason, it is possible without change of the illuminating arrangement 9, to modify the variation range of the focal intercept simply by an exchange of the negative element 25 for another negative element having a different focal length. When, for example, for a negative element having a focal length of −149 mm, the focal intercept can be varied in a range from 170 mm to 217 mm, the variation range of the focal intercept can be modified to 240 mm to 345 mm with a negative element having a focal length of −119 mm.

The negative element 25 could have a partition interface along the peripheral section of the deflecting element 33 to further reduce reflections. The peripheral section is shown in phantom outline in FIG. 2 and the partition interface is opaque and extends parallel to the optical axis 7 of the viewing optic 3.

Table 1 presents the optical data of a specific embodiment of the illuminating arrangement 9.

The individual surfaces of the illuminating arrangement 9 are identified by Roman numerals in sequence starting with the end surface of the light conductor 29. Accordingly, the illuminated field diaphragm 31 has the number I and the individual lens surfaces of the collector 13 have the numbers II to VIII. Reference numeral VII identifies the partition interface of the collector composite element and the lens surfaces of the asymmetrical illuminating element 15 have the numbers IX to XI. The reference numeral X identifies the partition interface of lenses 21 and 23, the deflecting element 33 has the reference numeral XII and the surface numbers XIII to XV are assigned to the negative element 25.

The center points of the circular arcs of the lens surfaces II to VIII are on the optical axis 11 and the center points of the circular arcs of the lens surfaces XIII to XV are on the optical axis 7 of the viewing optic 3. The center points of the circular arcs of the lens surfaces IX, X and XI of the asymmetrical illuminating element 15 lie on a straight line which lies between the optical axis 11 and the object 5 in the plane of the drawing of FIG. 1. The straight line is parallel to the optical axis 11 and is at a distance of 22 mm from the optical axis 11.

The glass type N-SK2, N-SK5, N-SF6, N-LAK10, SF57 and N-SSK8 are all available under these product numbers from Schott Glas, Mainz, Germany.

Figure 3:
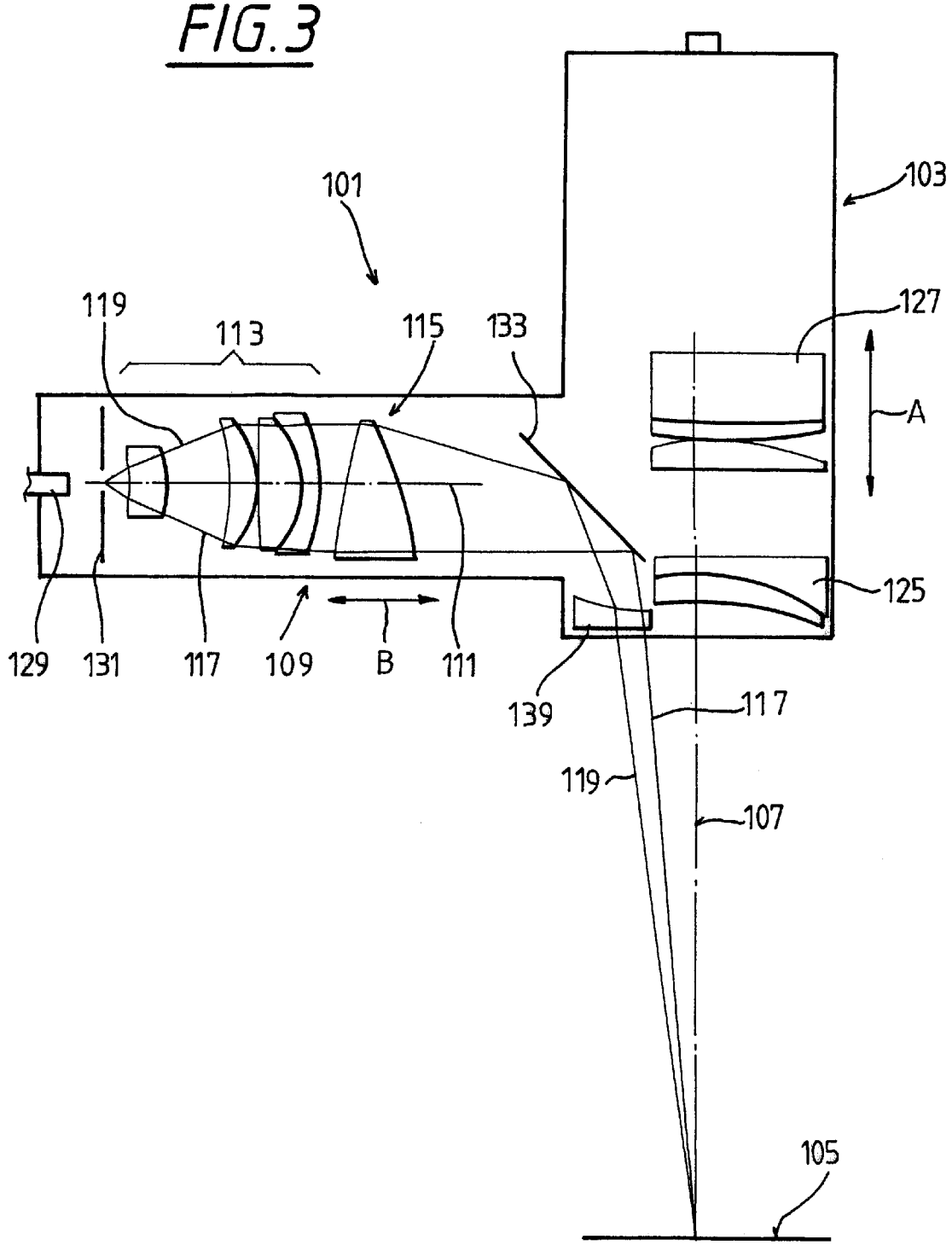
FIG. 3 is a second embodiment of a viewing apparatus according to the invention with this view corresponding to that of FIG. 1; and, FIG. 4 is a third embodiment of the invention corresponding to the view presented in FIG. 1.

FIG. 3 shows a further embodiment of the viewing apparatus 101. The elements of the viewing arrangement 101, which correspond to the elements of the viewing arrangement 1 of FIGS. 1 and 2, have the same reference numerals increased by 100. A description of these elements is presented in the description of FIGS. 1 and 2 above.

The asymmetrical illuminating element 115 of the viewing apparatus 101 is configured as a peripheral region of a single lens. Furthermore, the illuminating beam path of the viewing apparatus 101 passes through a peripheral region of a lens 139 having a negative refractive index after its deflection by the deflecting element 133. For this illuminating arrangement 109, which is relatively simple in view of the optical configuration thereof, the chromatic and spherical aberrations can be adequately corrected for illuminating purposes by a suitable selection of glass and a suitable selection of the radii of curvature of the lens elements 115 and 139.

Figure 4:
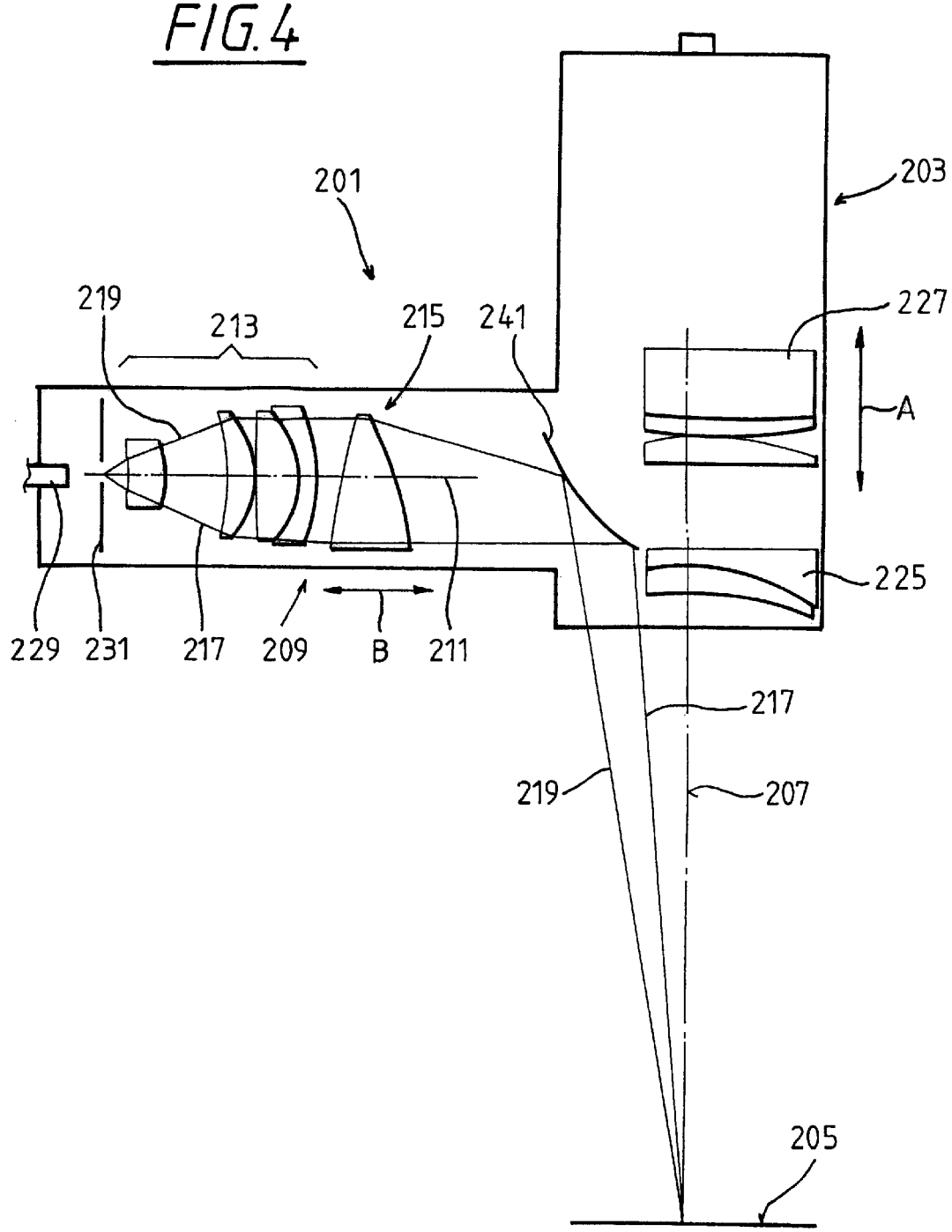

In FIG. 4, a further embodiment of the viewing arrangement 201 is shown. The elements of the viewing arrangement 201 correspond to those elements of the viewing arrangement 1 of FIG. 1 and have the same reference numerals as the elements in FIG. 1 increased by 200. Reference can be made to the description of these elements presented herein in connection with FIGS. 1 and 2.

The viewing arrangement 201 includes a convexly curved deflecting mirror 241. In the viewing arrangement, the negative element 225 of the viewing optic 203 is further so configured that the illuminating beam path does not pass through the negative element 225 after its deflection by the deflecting element 241.

In the viewing arrangement 201, the power of refraction of a negative lens is therefore applied to the deflecting element 241. In this way, a viewing arrangement 209 is provided having a reduced number of lenses and a correspondingly reduced weight.

In the context of the invention, asymmetrical to the illuminating beam path is intended to mean that the asymmetrical beam-shaping illuminating element (15, 115, 215) is asymmetrical to the optical axis of illuminating elements which axis runs transverse to the viewing beam path. These illuminating elements are centered on this axis. Illuminating elements of this kind can be a light source, for example, the end face of an illuminating fiber and/or an illuminated field diaphragm and/or a collector, et cetera.

When the asymmetrical illuminating element includes an off-center region of a lens element or corresponds to this off-center region, then this element can be manufactured in a simple manner starting from the corresponding lens element in that several asymmetrical illuminating elements are cut out of the, in general, rotational symmetrical lens element. In this way, material, weight, structural space and manufacturing costs of the illuminating arrangement are reduced.

In a further embodiment of the invention, the asymmetrical illuminating element (15, 115, 215) is displaceable along the illuminating beam path. In this way, for example, illuminating field diameters and illuminating angles can be changed in a targeted manner in dependence upon or even independently of the viewing optic.

It is, however, especially advantageous when a displaceable asymmetrical illuminating element is combined with a displaceable lens element (27, 127, 227) of the viewing optic, which is displaceable along the viewing beam path, and the displacement of the asymmetrical illuminating element (15, 115, 215) is coupled to the displacement of the displaceable lens element (27, 127, 227). In this way, the illumination is always optimally adapted to the particular viewing conditions without a passthrough of the illuminating beam path through the displaceable lens element.

Especially when the displaceable lens element is a lens element of an objective having a variable focal intercept, then an illuminating field, which is centered to the object field or image field, can be achieved without cropping the image field. The diameter of the illuminating field is here equal to the diameter of the object field. Disturbing brightness and reflections in the image field are substantially avoided because of the invention.

According to the invention, it is therefore possible to form the illuminating beam as though the illuminating beam had passed through the displaceable lens element whereby the illumination is always optimally adapted to the particular image field. The separation of the illuminating zone from the viewing zone or from the two stereoscopic viewing zones is required to preclude illuminating reflections in the viewing beam path. This separation is achieved, in accordance with the invention, by the asymmetrical illuminating element arranged in the section of the illuminating beam path running transversely to the viewing beam path.

The viewing zone in the displaceable lens element can become relatively large especially for an objective of variable focal intercept with the viewing zone being passed through by the viewing beams. Without the invention, the separation of the illuminating zone from the viewing zone in order to avoid illuminating reflections would have to be ensured by a relatively large spacing of the illuminating beam path from the optical axis or symmetry axis of the displaceable lens element. In this case, either the illuminating beam path would be cropped or a displaceable lens element having an exceptionally large diameter would be necessary, which, in turn, would lead to an increase of the illuminating angle and therefore to an increased shading in the object field.

In another embodiment of the invention, a deflecting element (33, 133, 241) deflects the illuminating beam path to the object (5, 105, 205). Especially for a stereoscopic viewing apparatus, this deflecting element can be mounted without a discernable cropping of the object field between the two stereoscopic viewing channels relatively close to the optical axis of the viewing optic whereby an optical illuminating angle can be achieved. This optimal illuminating angle defines a compromise between an illumination as inclined as possible to increase the stereoscopic impression and an illumination as steep as possible for completely illuminating details of the object. In this connection, the steep illumination is an illumination coaxial to the optical axis of the viewing optic.

In the deflecting element is configured as a convex mirror 241, then the deflecting element operates as a beam-shaping element of negative refractive power. An objective of variable focal intercept can comprise a stationary lens element having a negative refractive power and a displaceable lens element having a positive refractive power. Because of the convex mirror, for this objective, it is not necessary that the illuminating beam path passes through the lens element having negative refractive power.

The object plane is illuminated in a circular pattern with a deflecting element having a toric mirror surface and the deflecting element is arranged at an angle of 45° to the illuminating beam path.

An illuminating arrangement built up relatively simply ensures an embodiment wherein a lens element 139, which is asymmetrical to the illuminating beam path, is provided between the defecting element 133 and the object 105. For a lens element of this kind, a peripheral region of a spectacle lens of negative refractive power is especially suitable. The chromatic aberration can be adequately corrected via a suitable selection of glass and the spherical aberration for illuminating purposes can be adequately corrected via a suitable bending of the lens.

In a further embodiment of the invention, the illuminating beam path passes through an off-center region of the objective lens element 25 of the viewing optic. In this embodiment, the off-center region of the objective lens element satisfies a function forming the illuminating beam. For this function, a separate optical element of the illuminating arrangement is unnecessary.

If the asymmetrical illuminating element (15, 115, 215) and the displaceable lens element (27, 127, 227) of the viewing optic (3, 103, 203) have a positive refractive power, then the optical effect of the asymmetrical illuminating element on the illuminating field and the optical effect of the displaceable lens element on the image field can be matched optimally to each other.

Favorable imaging conditions are obtained especially when a lens element (arranged between a deflecting element and the object) or an objective lens element of the viewing optic (with the illuminating beam passing its peripheral region) has a negative refractive power.

In view of a modular configuration of the illuminating arrangement, it is advantageous when parallel illuminating beams are present ahead of the asymmetrical element (15, 115, 215) in the illuminating beam path.

It is understood that the foregoing description is that of the preferred embodiments of the invention and that various changes and modifications may be made thereto without departing from the spirit and scope of the invention as defined in the appended claims.

TABLE 1

| Surface Numbers | Radius of Curvature in mm | Thickness and Air Distance in mm | Medium |
|---|---|---|---|
| | | Fiber 29 | |
| | | 2.9 | Air |
| I | Planar | | Illuminated Field Diaphragm 31 |
| | | 2.0 | Air |
| II | −18.836 | | |
| | | 7.0 | N-SK2 |
| III | −15.289 | | |
| | | 11.0 | Air |
| IV | −38.681 | | |
| | | 5.0 | N-SK2 |
| V | −15.963 | | |
| | | 0.1 | Air |
| VI | 202.42 | | |
| | | 8.0 | N-SK5 |
| VII | −15.622 | | |
| | | 3.0 | N-SF6 |
| VIII | −30.505 | | |
| | | 2.0 . . . 17.94 | Air |
| IX | 102.92 | | |
| | | 16.0 | N-LAK10 |
| X | −73.388 | | |
| | | 4.0 | SF57 |
| XI | −302.87 | | |
| | | 27.311 . . . 11.37 | Air |
| XII | Planar | | Mirror 33 |
| | | 10.0 | Air |

TABLE 1-continued

| Surface Numbers | Radius of Curvature in mm | Thickness and Air Distance in mm | Medium |
|---|---|---|---|
| XIII | Planar | | |
| | | 5.0 | N-SSK8 |
| XIV | 37.584 | | |
| | | 5.0 | N-SF6 |
| XV | 57.049 | | |
| | | 207 . . . 422 Object Plane | Air |

What is claimed is:

1. A viewing arrangement comprising:
   a viewing optical assembly for viewing an object along a viewing beam path;
   an illuminating assembly for illuminating said object along an illuminating beam path having a segment running transversely to said viewing beam path; and,
   a beam-shaping illuminating element arranged in said segment of said illuminating beam path and being configured to be asymmetrical relative to said illuminating beam path.

2. The viewing arrangement of claim 1, wherein said illuminating element is an off-center portion of a lens element.

3. The viewing arrangement of claim 1, wherein said beam-shaping illuminating element is displaceable along said illuminating beam path.

4. The viewing arrangement of claim 3, wherein said viewing optical assembly includes a displaceable lens element displaceable along said viewing beam path.

5. The viewing arrangement of claim 4, further comprising a connecting device for coupling the displacement of said beam-shaping element to the displacement of said displaceable lens element.

6. The viewing arrangement of claim 1, further comprising a deflecting element for deflecting said illuminating beam path to said object.

7. The viewing arrangement of claim 6, wherein said deflecting element is configured as a convex mirror.

8. The viewing arrangement of claim 6, further comprising a lens element disposed between said deflecting element and said object and being configured so as to be asymmetrical with respect to said illuminating beam path.

9. The viewing arrangement of claim 8, wherein said viewing optical assembly includes an objective lens and said lens element disposed between said deflecting element and said object is configured as an off-center region of said objective lens.

10. The viewing arrangement of claim 8, wherein said viewing optical assembly includes a displaceable lens element displaceable along said viewing beam path; and, said beam-shaping illuminating element and said displaceable lens element of the viewing optical assembly both having a positive refractive power.

11. The viewing arrangement of claim 8, wherein said lens element disposed between said deflecting element and said object has a negative refractive power.

12. The viewing arrangement of claim 1, wherein parallel beams are present in said illuminating beam path ahead of said beam-shaping illuminating element.

13. The viewing arrangement of claim 1, wherein said viewing optical assembly includes a plurality of lenses arranged on said viewing beam path; a first one of said lenses having a positive refractive power and a second one of said lenses having a negative refractive power.

* * * * *